United States Patent
Sivakumar

(10) Patent No.: US 12,416,726 B2
(45) Date of Patent: Sep. 16, 2025

(54) SYSTEMS AND METHODS FOR ENHANCING OUTPUTS OF A LIDAR

(71) Applicants: Denso International America, Inc., Southfield, MI (US); DENSO Corporation, Aichi (JP)

(72) Inventor: Prasanna Kumar Sivakumar, Canton, MI (US)

(73) Assignees: Denso International America, Inc., Southfield, MI (US); Denso Corporation, Kariya (JP)

(*) Notice: Subject to any disclaimer, the term of this patent is extended or adjusted under 35 U.S.C. 154(b) by 922 days.

(21) Appl. No.: 17/025,730

(22) Filed: Sep. 18, 2020

(65) Prior Publication Data

US 2022/0091266 A1   Mar. 24, 2022

(51) Int. Cl.
*G01S 17/89* (2020.01)
*B60W 60/00* (2020.01)
(Continued)

(52) U.S. Cl.
CPC .......... *G01S 17/89* (2013.01); *B60W 60/001* (2020.02); *G01S 7/4816* (2013.01); *G01S 17/931* (2020.01);
(Continued)

(58) Field of Classification Search
CPC ...... G01S 17/89; G01S 7/4816; G01S 17/931; G01S 7/4808; B60W 60/001; B60W 2420/42; B60W 2420/52; G06T 1/20; G06T 3/4046; G06T 3/4053; G06T 5/006; G06T 5/50; G06T 2207/10024; G06T 2207/10028; G06T 2207/20084; G06T 2207/30252
(Continued)

(56) References Cited

U.S. PATENT DOCUMENTS 8,655,513 B2   2/2014   Vanek et al.
9,360,554 B2   6/2016   Retterath et al.
(Continued)

FOREIGN PATENT DOCUMENTS

EP   2291677 B1   1/2014
JP   2019168417 A   10/2019

OTHER PUBLICATIONS

Xiang et al., "3dDepthNet: Point Cloud Guided Depth Completion Network for Sparse Depth and Single Color Image", found at: arXiv:2003.09175v1 [cs.CV] Mar. 20, 2020.
(Continued)

*Primary Examiner* — Jennifer Mehmood
*Assistant Examiner* — Pardis Sohraby
(74) *Attorney, Agent, or Firm* — Christopher G. Darrow; Darrow Mustafa PC

(57) ABSTRACT

Systems, methods, and other embodiments described herein relate to enhancing an output of a LiDAR sensor. In one embodiment, a method includes acquiring, using the LiDAR sensor, a point cloud and an ambient image. The method includes processing the point cloud and the ambient image to generate enhanced data according to an enhancer pipeline that includes a set of processing routines. The method includes providing the enhanced data to at least one module to facilitate generating determinations about a surrounding environment of the LiDAR sensor from the enhanced data.

20 Claims, 9 Drawing Sheets

(51) Int. Cl.
*G01S 7/481* (2006.01)
*G01S 17/931* (2020.01)
*G06T 1/20* (2006.01)
*G06T 3/4046* (2024.01)
*G06T 3/4053* (2024.01)
*G06T 5/50* (2006.01)
*G06T 5/80* (2024.01)

(52) U.S. Cl.
CPC ............. *G06T 1/20* (2013.01); *G06T 3/4046* (2013.01); *G06T 3/4053* (2013.01); *G06T 5/50* (2013.01); *G06T 5/80* (2024.01); *B60W 2420/403* (2013.01); *B60W 2420/408* (2024.01); *G06T 2207/10024* (2013.01); *G06T 2207/10028* (2013.01); *G06T 2207/20084* (2013.01); *G06T 2207/30252* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 10,176,596 | B1 * | 1/2019 | Mou | G06V 10/44 |
| 10,474,161 | B2 * | 11/2019 | Huang | G06V 20/56 |
| 10,621,697 | B2 | 4/2020 | Chou et al. | |
| 11,282,180 | B1 * | 3/2022 | Saxena | G06V 20/20 |
| 11,508,042 | B1 * | 11/2022 | Knuffman | G06T 5/77 |
| 2018/0357773 | A1 * | 12/2018 | Wang | G06T 7/246 |
| 2019/0004533 | A1 * | 1/2019 | Huang | G01S 17/86 |
| 2019/0187253 | A1 | 6/2019 | Ghosh | |
| 2019/0250257 | A1 * | 8/2019 | Finkelstein | G01S 7/4863 |
| 2019/0251401 | A1 * | 8/2019 | Shechtman | G06V 10/82 |
| 2020/0064479 | A1 | 2/2020 | Holleczek et al. | |
| 2020/0167972 | A1 * | 5/2020 | Birnhack | G06N 3/045 |
| 2020/0182982 | A1 * | 6/2020 | Sun | G01S 7/4865 |
| 2020/0198690 | A1 | 6/2020 | Kurihara | |
| 2020/0284883 | A1 | 9/2020 | Ferreira et al. | |
| 2021/0339738 | A1 * | 11/2021 | Lashkari | G01S 17/86 |
| 2022/0058817 | A1 * | 2/2022 | Vaquero Gomez | G06T 7/593 |
| 2022/0327719 | A1 * | 10/2022 | Shaag | G01S 7/4817 |
| 2023/0022429 | A1 * | 1/2023 | Cocaud | G01S 13/935 |

OTHER PUBLICATIONS

Pillai et al., "SuperDepth: Self-Supervised, Super-Resolved Monocular Depth Estimation", found at: arXiv:1810.01849v1 [cs.CV] Oct. 3, 2018.

Xu et al., "Depth Completion from Sparse LiDAR Data with Depth-Normal Constraints", found at: arXiv:1910.06727v1 [cs.CV] Oct. 15, 2019.

Komoto et al., A Performance Evaluation of Defect Detection by using Denoising AutoEncoder Generative Adversarial Networks, IEEE, 2018.

* cited by examiner

SYSTEMS AND METHODS FOR ENHANCING OUTPUTS OF A LIDAR

TECHNICAL FIELD

The subject matter described herein relates in general to systems and methods for enhancing outputs of a LiDAR, and, more particularly, to implementing a processing pipeline that enhances an ambient image and a point cloud output by the LiDAR.

BACKGROUND

Perceiving an environment can be an important aspect for many different computational functions, such as automated vehicle assistance systems, security monitoring, and so on. However, accurately perceiving the environment can be a complex task that balances costs of sensors with an extent of precision associated with the sensors. For example, while some Light detection and ranging (LiDAR) sensors may be highly accurate, they can also be very expensive and bulky. By contrast, other LiDAR sensors may be less expensive and more compact, but can lack the precision, resolution, or other characteristics to sufficiently support certain functions, such as automated driving functions. In one instance, a single photon avalanche diode (SPAD) based LiDAR may be implemented as a less expensive option that also provides the ability to produce ambient light images, thereby doing the work of two sensors in one. Yet, such a sensor may encounter various difficulties. The difficulties may include low resolution images, sparse point clouds at longer distances, saturation from sunlight, and so on. Consequently, even though the SPAD-based LiDAR provides multifunctionality, the information that the SPAD-based LiDAR provides is generally not adequate for many purposes.

SUMMARY

In one embodiment, example systems and methods associated with enhancing outputs of a LiDAR sensor are disclosed. As previously noted, tradeoffs between cost and characteristics of output data may occur when selecting a sensor. As such, the sensor may not provide high-resolution data or dense depth outputs. Therefore, taken alone, the outputs of the sensor may not be adequate to serve as the basis for various computations.

However, in one embodiment, a disclosed approach enhances the outputs of the sensor in order to improve the quality of the outputs such that the various computations can provide accurate determinations. For example, in at least one aspect, a disclosed system implements a post-processing pipeline that includes multiple different stages to improve the quality of the sensor data. That is, in the instance of a SPAD-based LiDAR, the LiDAR outputs a point cloud that indicates depth data for an observed region of the surrounding environment and also an ambient light image of the observed region. That is, while LiDAR sensors are generally known for providing point cloud data alone, a SPAD-based sensor may also provide ambient light images. Thus, this particular type of LiDAR sensor provides additional functionality.

Accordingly, the disclosed system implements an enhancer pipeline that functions to enhance the ambient image and the point cloud. In at least one approach, the enhancer pipeline includes separate modules that may be comprised of machine learning algorithms to perform various enhancement functions. The separate modules may include modules to super-resolve the ambient image into a high-resolution image, complete missing portions of the image, colorize the image, and so on. In one or more arrangements, the enhanced ambient image may then be used in combination with the original point cloud to also enhance the point cloud. For example, the enhancer pipeline may include a module that densifies (i.e., adds additional depth points) to the point cloud. The various modules of the enhancer pipeline may implement machine learning algorithms or other computational approaches to achieve the noted effects. In any case, the enhancer pipeline improves the original sensor data, thereby ensuring the outputs of the original sensor are adequate to support the noted computations. In this way, the disclosed approach provides for using more cost-effective sensors while also providing quality sensor data to support automated driving functions and other functions that require more precise information.

In one embodiment, a refinement system for enhancing an output of a LiDAR sensor is disclosed. The refinement system includes one or more processors and a memory that is communicably coupled to the one or more processors. The memory stores a sensor module including instructions that when executed by the one or more processors cause the one or more processors to acquire, using the LiDAR sensor, a point cloud and an ambient image. The memory stores a pipeline module including instructions that when executed by the one or more processors cause the one or more processors to process the point cloud and the ambient image to generate enhanced data according to an enhancer pipeline that includes a set of processing routines. The pipeline module includes instructions to provide the enhanced data to at least one module to facilitate generating determinations about a surrounding environment of the LiDAR sensor from the enhanced data.

In one embodiment, a non-transitory computer-readable medium is disclosed. The computer-readable medium stores instructions for enhancing an output of a LiDAR sensor and that when executed by one or more processors cause the one or more processors to perform the disclosed functions. The instructions include instructions to acquire, using the LiDAR sensor, a point cloud and an ambient image. The instructions include instructions to process the point cloud and the ambient image to generate enhanced data according to an enhancer pipeline that includes a set of processing routines. The instructions include instructions to provide the enhanced data to at least one module to facilitate generating determinations about a surrounding environment of the LiDAR sensor from the enhanced data.

In one embodiment, a method of enhancing an output of a LiDAR sensor is disclosed. In one embodiment, a method includes acquiring, using the LiDAR sensor, a point cloud and an ambient image. The method includes processing the point cloud and the ambient image to generate enhanced data according to an enhancer pipeline that includes a set of processing routines. The method includes providing the enhanced data to at least one module to facilitate generating determinations about a surrounding environment of the LiDAR sensor from the enhanced data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with enhancing outputs of a LiDAR sensor are disclosed. As previously noted, tradeoffs between cost and characteristics of output data may occur when selecting a sensor. As such, the sensor may not provide high-resolution data or dense depth outputs, which may interfere with some computational functions providing accurate outputs. However, in one embodiment, a disclosed approach enhances the sensor data in order to improve the quality of the outputs such that the various computations can provide accurate determinations.

For example, in at least one aspect, a disclosed system implements a post-processing pipeline that includes multiple different processing stages to improve the quality of the sensor data. That is, in the instance of a SPAD-based LiDAR, the LiDAR outputs a point cloud that indicates depth data for an observed region of the surrounding environment and also an ambient light image of the observed region. That is, while LiDAR sensors are generally known for providing point cloud data alone, a SPAD-based sensor may also provide ambient light images. Thus, this particular type of LiDAR sensor provides additional functionality as an added benefit. However, as noted, the quality of the ambient images may suffer from over-saturation, low resolution, and so on. Moreover, the point cloud data may be sparse at greater distances.

Accordingly, the disclosed system implements an enhancer pipeline that functions to enhance the ambient image and the point cloud. In at least one approach, the enhancer pipeline includes separate modules that may be comprised of machine learning algorithms to perform various enhancement functions. The separate modules may include modules to super-resolve the ambient image into a high-resolution image, complete missing portions (e.g., occluded or over-saturated segments) of the image, colorize the image, and so on. In one or more arrangements, the enhanced ambient image may then be used in combination with the original point cloud to also enhance the point cloud. For example, the enhancer pipeline may include a module that densifies (i.e., adds additional depth points) to the point cloud. The various modules of the enhancer pipeline may implement machine learning algorithms or other computational approaches to achieve the noted outcomes. In any case, the enhancer pipeline improves the original sensor data, thereby ensuring the outputs are adequate to support the noted computations. In this way, the disclosed approach provides for using more cost-effective sensors while also providing quality sensor data to support automated driving functions and other functions that require more precise information.

Figure 1:
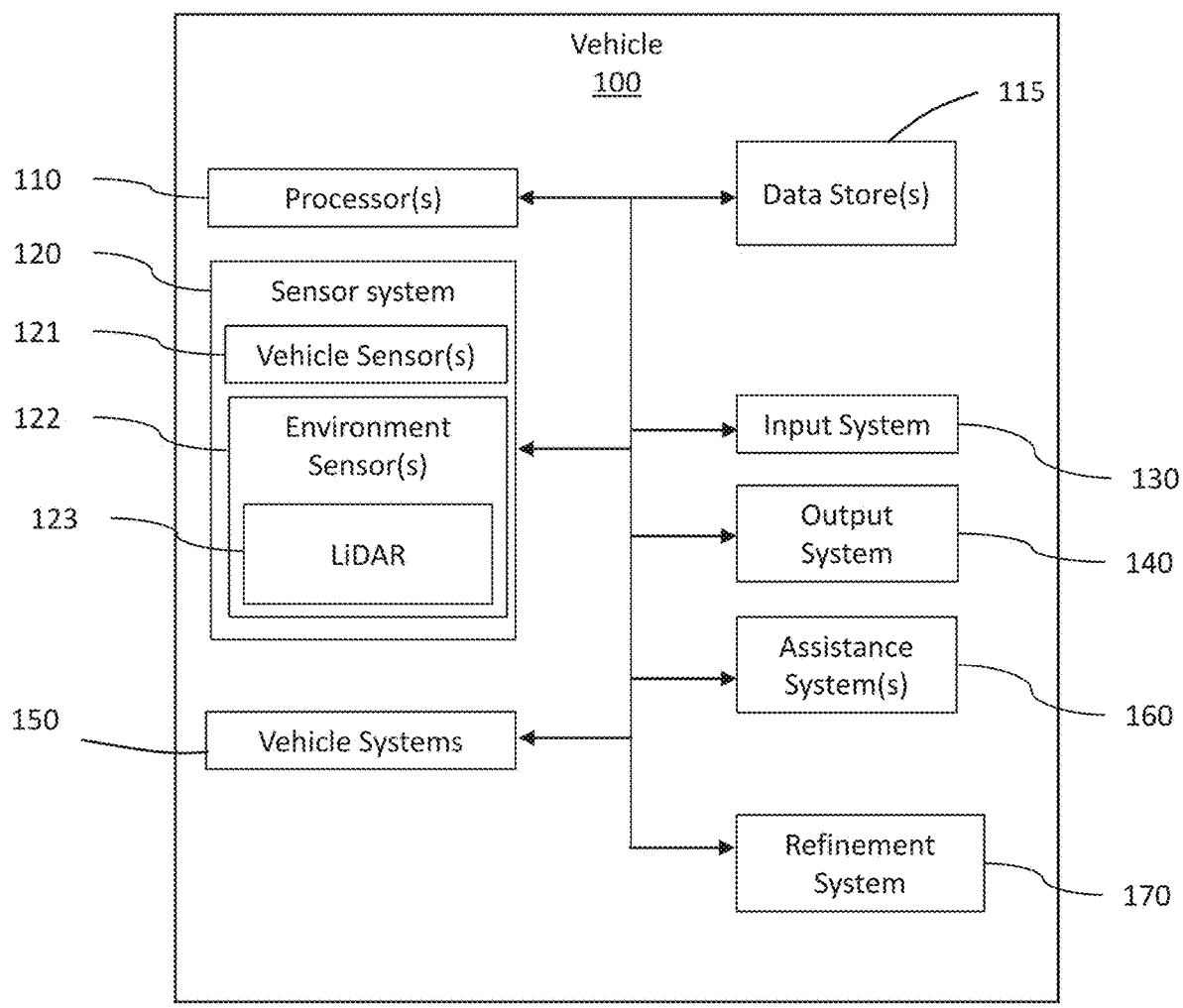
FIG. 1 illustrates one embodiment of a configuration of a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device or form of transport that, for example, includes the noted sensor to acquire observations of a surrounding environment, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a refinement system 170 that functions to improve the quality of sensor data from a LiDAR sensor 123. Moreover, while depicted as a standalone component, in one or more embodiments, the refinement system 170 is integrated with the assistance system 160, or another similar system of the vehicle 100 to facilitate functions of the other systems/modules. The noted functions and methods will become more apparent with a further discussion of the figures.

Figure 2:
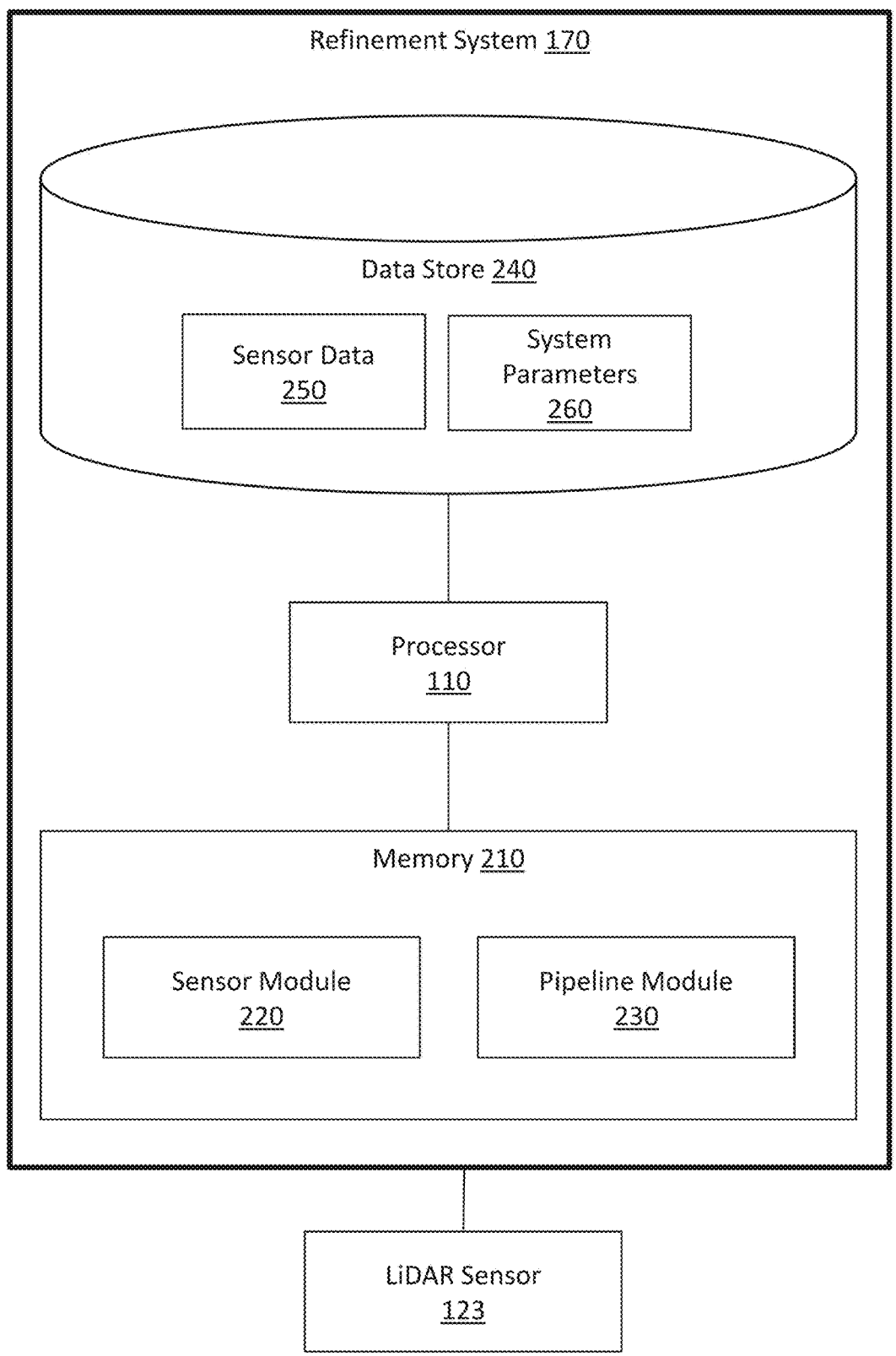
FIG. 2 illustrates one embodiment of a refinement system that is associated with enhancing sensor outputs.

With reference to FIG. 2, one embodiment of the refinement system 170 is further illustrated. As shown, the refinement system 170 includes a processor 110. Accordingly, the processor 110 may be a part of the refinement system 170, or the refinement system 170 may access the processor 110 through a data bus or another communication pathway. In one or more embodiments, the processor 110 is an application-specific integrated circuit that is configured to implement functions associated with a sensor module 220 and a pipeline module 230. More generally, in one or more aspects, the processor 110 is an electronic processor such as a microprocessor that is capable of performing various functions as described herein when executing encoded functions associated with the refinement system 170.

In one embodiment, the refinement system 170 includes a memory 210 that stores the sensor module 220 and the pipeline module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers), circuits, etc. for independently performing one or more of the noted functions.

Furthermore, in one embodiment, the refinement system 170 includes a data store 240. The data store 240 is, in one embodiment, an electronically-based data structure for storing information. For example, in one approach, the data store 240 is a database that is stored in the memory 210 or another suitable medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250, and system parameters 260 (e.g., sensor settings, pipeline settings, timing thresholds, activation zones, scanning zones, alert options, etc.) along with, for example, other information that is used by the modules 220 and 230.

Accordingly, the sensor module 220 generally includes instructions that function to control the processor 110 to acquire data inputs from one or more sensors (e.g., the LiDAR sensor 123) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is traveling or parked.

While the sensor module 220 is discussed as controlling the various sensors to provide the sensor data 250, in one or more embodiments, the sensor module 220 can employ other techniques to acquire the sensor data 250 that are either active or passive. For example, the sensor module 220 may passively sniff the sensor data 250 from a stream of electronic information provided by the various sensors to further components within the vehicle 100. Moreover, the sensor module 220 can undertake various approaches to fuse data from multiple sensors when providing the sensor data 250. Thus, the sensor data 250, in one embodiment, represents a combination of perceptions acquired from multiple sensors.

Thus, whether the sensor data 250 is derived from a single sensor or multiple sensors, the sensor data 250 is comprised of at least two separate forms of data. In one or more arrangements, the sensor data 250 is comprised of a point cloud and an ambient image. In yet further arrangements, the sensor data 250 may include a third element that is an intensity image. In any case, the LiDAR sensor 123 may be a single-photon avalanche diode (SPAD)-based LiDAR. This particular type of LiDAR sensor can acquire the noted data elements in parallel. That is, while the LiDAR sensor 123 is scanning the surrounding environment, the LiDAR sensor is acquiring depth data and image data in parallel. The depth data takes the form of the point cloud, and the image data may take the form of the ambient image and, in some arrangements, an intensity image.

As previously noted, the LiDAR sensor 123 may not provide high-resolution data. That is, the point cloud and the ambient image may be of relatively low resolution. Moreover, the ambient image may be grayscale and may also include various aberrations, such as over-saturation of areas in the image due to sunlight being incident upon elements in the image. The intensity image, in at least one aspect, includes reflectively levels for objects/surfaces present within a field-of-view of the sensor 123. Thus, the intensity image generally corresponds to the reflective strengths of each separate point in the point cloud.

Moreover, the sensor module 220, in one embodiment, controls the sensors to acquire the sensor data 250 about an area that encompasses 360 degrees about the vehicle 100 in order to provide a comprehensive assessment of the surrounding environment. Of course, depending on the particular implementation, the subject sensor(s) may have a field-of-view that is focused on a rear area behind the vehicle 100, an area alongside the vehicle 100, or another region around the vehicle 100. Moreover, views from multiple sensors may be stitched together to form a wider field of view.

In any case, once the sensor module 220 acquires the sensor data 250, the refinement system 170 may then leverage the pipeline module 230 to enhance the sensor data 250 output from the LiDAR sensor 123. The pipeline module 230 implements the enhancer pipeline to perform multiple different post-processing steps on the sensor data 250, thereby improving the quality of the original sensor data by, for example, enhancing resolution, filling-in missing regions, colorizing, and generating further depth information.

Figure 3:
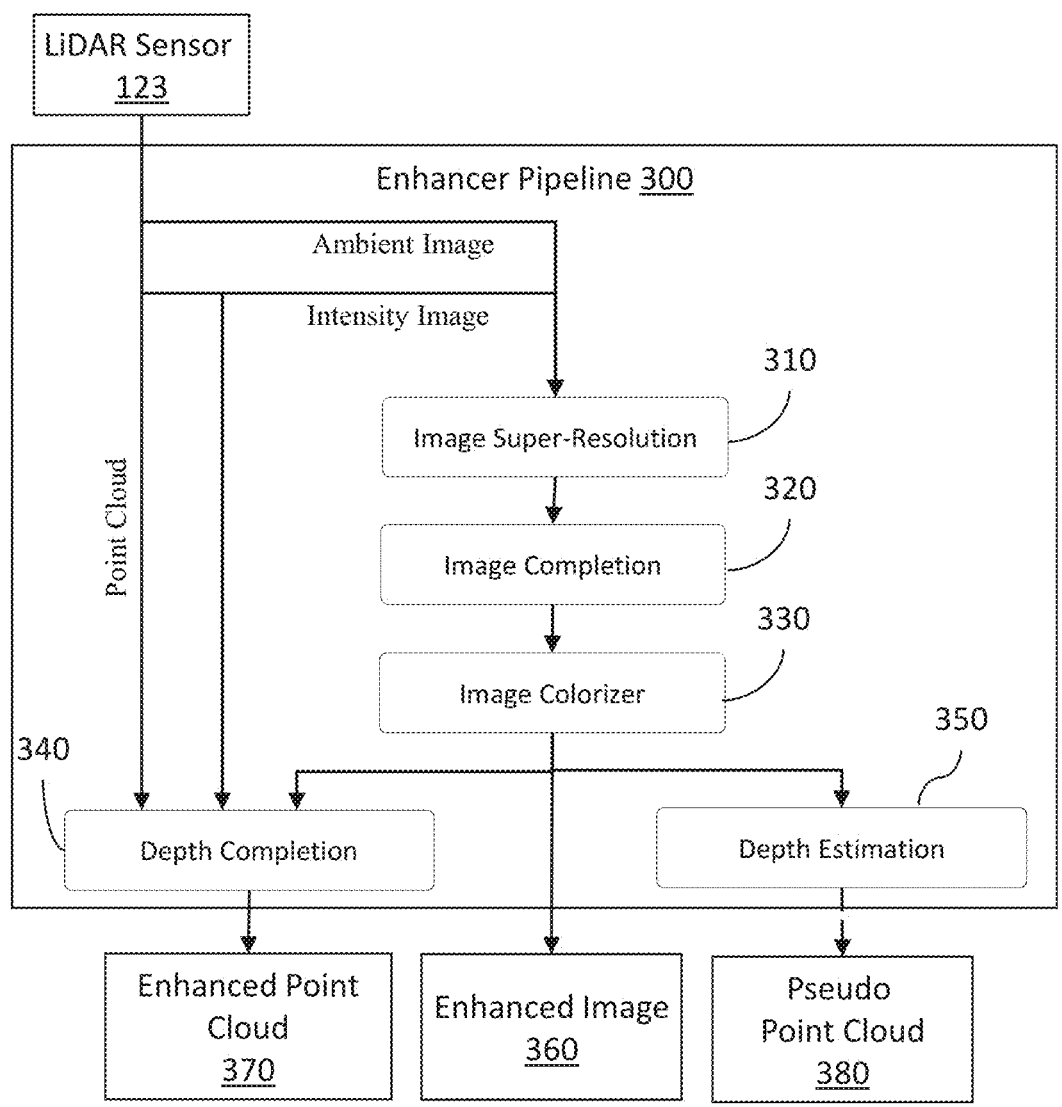
FIG. 3 illustrates a diagram of one arrangement of an enhancer pipeline.

As one example of the enhancer pipeline implemented by the pipeline module 230, consider FIG. 3. FIG. 3 illustrates one embodiment of an enhancer pipeline 300 that includes multiple stages of processing modules. As shown in FIG. 3, the enhancer pipeline 300 includes modules for image super-resolution 310, image completion 320, image colorizer 330, and depth completion 340. The enhancer pipeline 300, in further arrangements, may also include a module for depth estimation 350. In any case, the various modules are, in general, comprised of deep neural networks or other machine learning algorithms. By way of example, the modules may include generative adversarial networks (GANs), convolutional neural networks, autoencoders, and so on. In one or more approaches, the modules may share portions of a network (e.g., decoders). In yet further approaches, the modules may include separate instances of networks that are specific to the corresponding task of the module.

In reference to the general functions of the modules themselves, the image super-resolution module 310 accepts the ambient image from the LiDAR sensor 123. The ambient super-resolution module 310 then processes the ambient image of the sensor data 250 to produce an enhanced image that is a high-resolution in comparison to the original ambient image. In a further approach, the super-resolution module 310 may further use an intensity image in addition to the ambient image to super-resolve the high-resolution image. The intensity image includes information about reflectivities of objects/surfaces within the scene depicted by the ambient image, and thus provides additional information for performing the super-resolution.

As one example, the image super-resolution module 310 may implement single-image super-resolution using deep learning that involves implementing a GAN to increase the resolution of the original ambient image. Thus, the GAN functions as a super-resolution neural network to produce enhanced data in the form of the super-resolved high-resolution image. In another approach, the module 310 may implement a convolutional neural network that includes, for example, skip connections or may implement another network architecture to super-resolve the image. In general, the process of super-resolving the image may double the resolution of the original ambient image or increase the resolution by a greater extent depending on the availability of computational resources and the specific machine learning approach that the module 310 implements.

In reference to the module for image completion 320, consider that because of the nature of the photo-detector within the LiDAR sensor 123, the ambient image may include various aberrations. The aberrations may include regions that are over-saturated, regions that are too dark, and so on. This generally occurs because the LiDAR sensor 123 optimizes the photo-detector for detecting reflected light from a scanning laser that has a particular wavelength. Accordingly, the noted regions of the ambient image may have little or no information. As such, the image completion module 320 uses the high-resolution version of the ambient image to predict portions of the ambient image that are missing or poorly represented because of the noted aberrations. This may include filling-in areas on which sunlight is incident in a scene or areas that are dimly lit because of sunlight being incident on another region of the ambient image. In any case, the image completion module 320 processes the high-resolution image derived from the ambient image according to a machine learning algorithm, such as a GAN or another generative network architecture that is trained to perform image completion. As such, the enhanced data comprises a still further enhanced image that is now of improved resolution and includes information for previously degraded regions of the image.

With continued reference to the enhancer pipeline 300, the image colorizer module 330 processes an output of the image completion module 320, which is an enhanced image that is both completed (i.e., filled-in to correct aberrations) and also of a high-resolution in comparison to the original ambient image. However, the original ambient image and the enhanced forms of the ambient image up to this point are grayscale images. Thus, the image colorizer module 330 colorizes the enhanced image into a fully red-green-blue (RGB) image, which is output as the enhanced image 360. In one approach, the image colorizer module 330 implements a fully convolutional neural network (CNN) to colorize the image. In this way, the enhancer pipeline 300 accepts an ambient image from the LiDAR sensor 123 that may have low-resolution and other impairments, and converts the ambient image into the enhanced image 360 through multiple stages of post-processing.

Additionally, the enhancer pipeline 300, in at least one approach, further includes a depth completion module 340. The depth completion module 340 functions to enhance the point cloud that the LiDAR sensor 123 originally acquires as part of the sensor data 250. In one arrangement, the depth completion module 340 accepts the enhanced image 360 and the point cloud as inputs. The depth completion module 340 densifies the original point cloud to produce an enhanced point cloud that includes high resolution, high range, and high quality resulting from combining information from the enhanced image 360 with the original point cloud to produce additional points. In one embodiment, the depth completion module 340 implements a machine learning algorithm, such as a deep neural network (DNN) or another machine learning architecture to generate the additional points when producing the enhanced point cloud 370. In this way, the enhancer pipeline 300 functions to process the point cloud and the ambient image to at least correct aberrations in the ambient image and generate the enhanced data with a visible light image (e.g., enhanced image 360 and the enhanced point cloud 370 derived from at least the ambient image and the original point cloud. Thus, the refinement system 170 may leverage a more cost-effective sensor and still provide high-quality sensor data therefrom.

As an additional aspect, in one or more embodiments, the enhancer pipeline 300 is configured with an additional branch that is a depth estimation module 350. The depth estimation module 350 implements a machine learning model, such as a monocular depth estimation model that predicts depth data from a monocular image, such as the enhanced image 360. The predicted depth data is output as a pseudo point cloud 380. Of course, in instances where the refinement system 170 receives the original point cloud from the LiDAR sensor 123, the depth estimation module 350 may be kept inactive. However, in instances where the point cloud is unreliable or unavailable, the refinement system 170 may activate the depth estimation module 350 to generate the pseudo point cloud 380 in place of the enhanced point cloud 370 or as a mechanism for verifying the enhanced point cloud 370. In any case, the enhancer pipeline 300 includes multiple processing paths for producing depth data.

Figure 4:
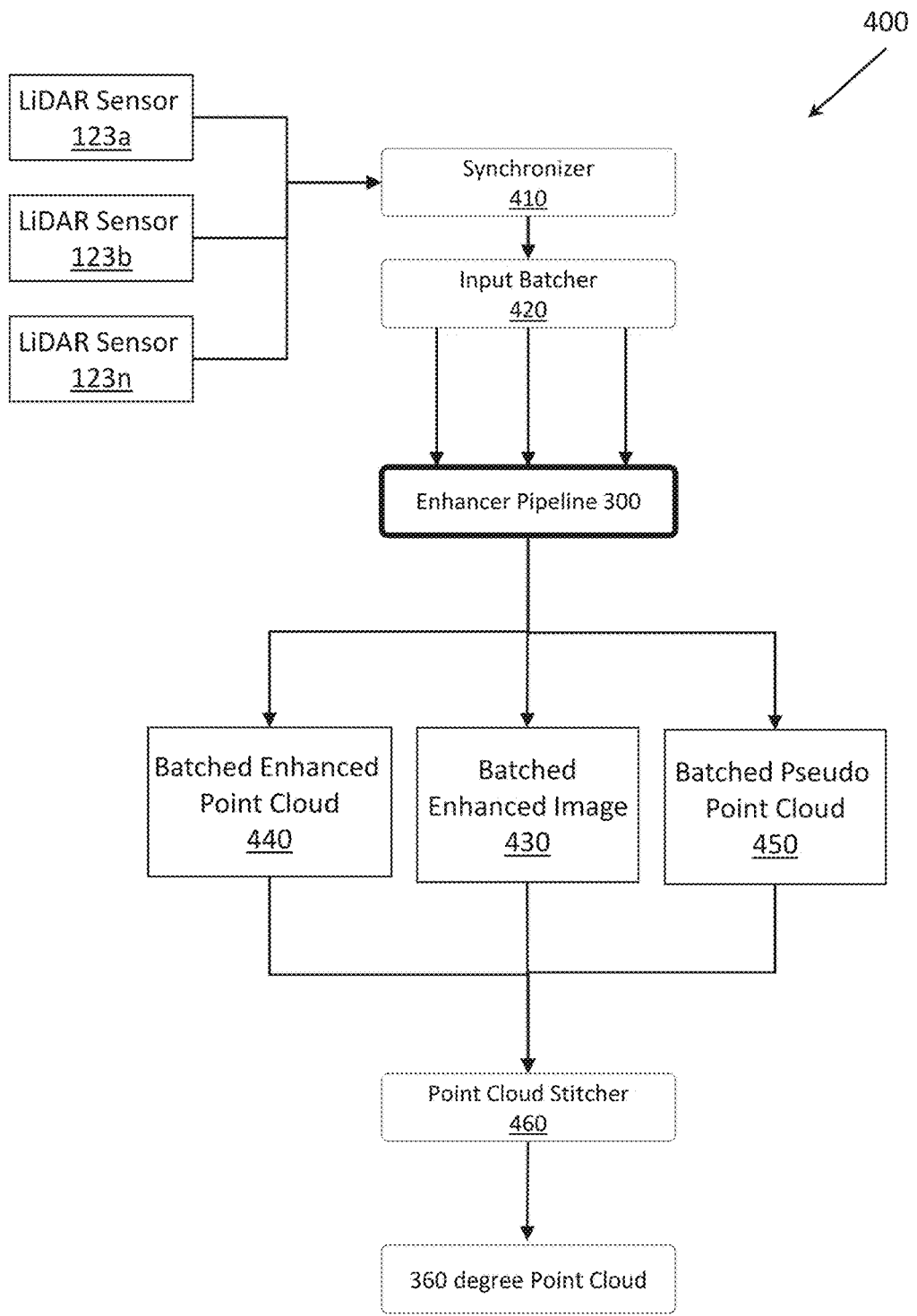
FIG. 4 is a diagram illustrating a batch process architecture for enhancing the outputs of multiple LiDARs in combination.

Turning to FIG. 4, an additional implementation of the enhancer pipeline 300 that is associated with processing data for multiple LiDARs in batches is illustrated. As shown in FIG. 4, the refinement system 170 may implement a batch processing architecture 400. That is, instead of repeating the enhancer pipeline 300 in multiple separate iterations within the pipeline module 230, the refinement system 170 implements additional components to facilitate the processing of batches of ambient images and point clouds from multiple LiDARs 123a, 123b, to 123n. For example, the batch processing architecture 400 may include a synchronizer 410. In one approach, the synchronizer 410 synchronizes output data from the LiDARs 123a-n, since the separate sensors may have slightly different timestamps on the provided sensor data 250. In this way, the synchronizer correlates data from similar timeframes for batch processing.

The architecture 400 further includes an input batcher 420 that concatenates data from different LiDAR sensors 123a-n to output time-synchronized batched tensors of the ambient images, point clouds, and, in one or more arrangements, also the intensity images. This batched sensor data 250 is then fed into the enhancer pipeline 300. The enhancer pipeline generates batched enhanced image 430, batched enhanced point cloud 440, and batched pseudo point cloud 450 that generally correlate with the similar elements described in relation to FIG. 3. The batched outputs 430-450 may then be provided to a point cloud stitcher 460, which stitches the enhanced batched data into a 360-degree point cloud. In this way, the batch processing architecture 400 can simplify processing the sensor data 250 when the refinement system 170 handles inputs from multiple LiDARs. Thus, the pipeline module 230 may then provide the enhanced data, whether from a single LiDAR or a batch, to at least one module, such as an automated driving module to facilitate control of a vehicle, perceiving aspects of the environment, or other functions. Accordingly, the refinement system 170 can generate the enhanced data to provide useful information from a cost-effective sensor, thereby improving the functioning of associated modules and devices.

Figure 5:
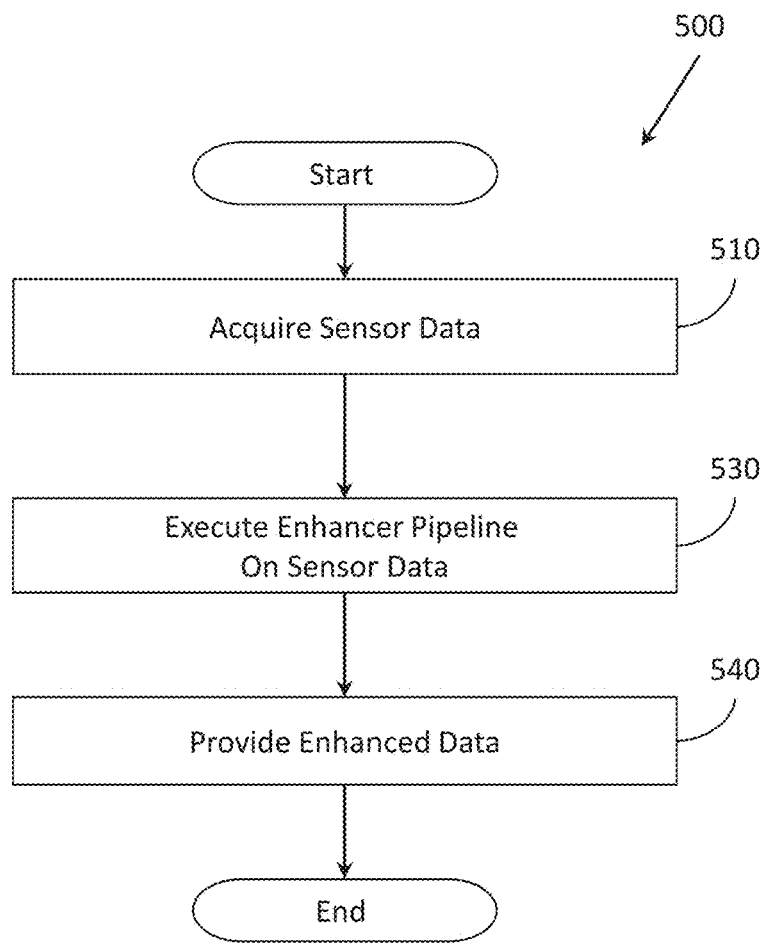
FIG. 5 illustrates one embodiment of a method associated with enhancing outputs of a LiDAR sensor.

Additional aspects of enhancing sensor data will be discussed in relation to FIG. 5. FIG. 5 illustrates a method 500 associated with enhancing an output of a LiDAR sensor. Method 500 will be discussed from the perspective of the refinement system 170 of FIG. 1. While method 500 is discussed in combination with the refinement system 170, it should be appreciated that the method 500 is not limited to being implemented within the refinement system 170 but is instead one example of a system that may implement the method 500.

At 510, the sensor module 220 acquires sensor data 250 from at least one sensor of the vehicle 100. In one embodiment, the sensor module 220 acquires the sensor data 250 about a surrounding environment of the vehicle 100. As previously noted, the sensor module 220, in one or more implementations, iteratively acquires the sensor data 250 from one or more sensors of the sensor system 120. The sensor data 250 includes observations of a surrounding environment of the subject vehicle 100, including specific regions that are relevant to functions executed by systems of the vehicle 100, such as assistance system 160 (e.g., activation zones, scanning zones, etc.), an automated driving module (e.g., autonomous driving, semi-autonomous driving, etc.), and so on. Moreover, the sensor module 220 acquires the sensor data 250, in at least one embodiment, from a SPAD-based LiDAR. As such, the sensor data 250 may include multiple separate data elements, including a point cloud, an ambient image, and an intensity image.

At 520, the pipeline module 230 executes the enhancer pipeline on the sensor data 250 to generate enhanced data. As noted above, the enhancer pipeline includes a set of enhancement processing routines that perform different functions over the sensor data 250 to improve the quality. The enhancer pipeline generally functions to correct aberrations in the ambient image and to provide additional data points within the point cloud. The specific blocks of the enhancer pipeline are further discussed in relation to method 600.

At 530, the pipeline module 230 provides the enhanced data to at least one module to facilitate generating determinations about a surrounding environment of the LiDAR sensor from the enhanced data. The pipeline module 230 may provide the enhanced data to local aspects of the vehicle 100, such as an automated driving module to facilitate control of a vehicle. In further aspects, the pipeline module 230 may function as a remote cloud-based resource to derive the enhanced data for various devices that include the LiDAR sensor 123.

Figure 6:
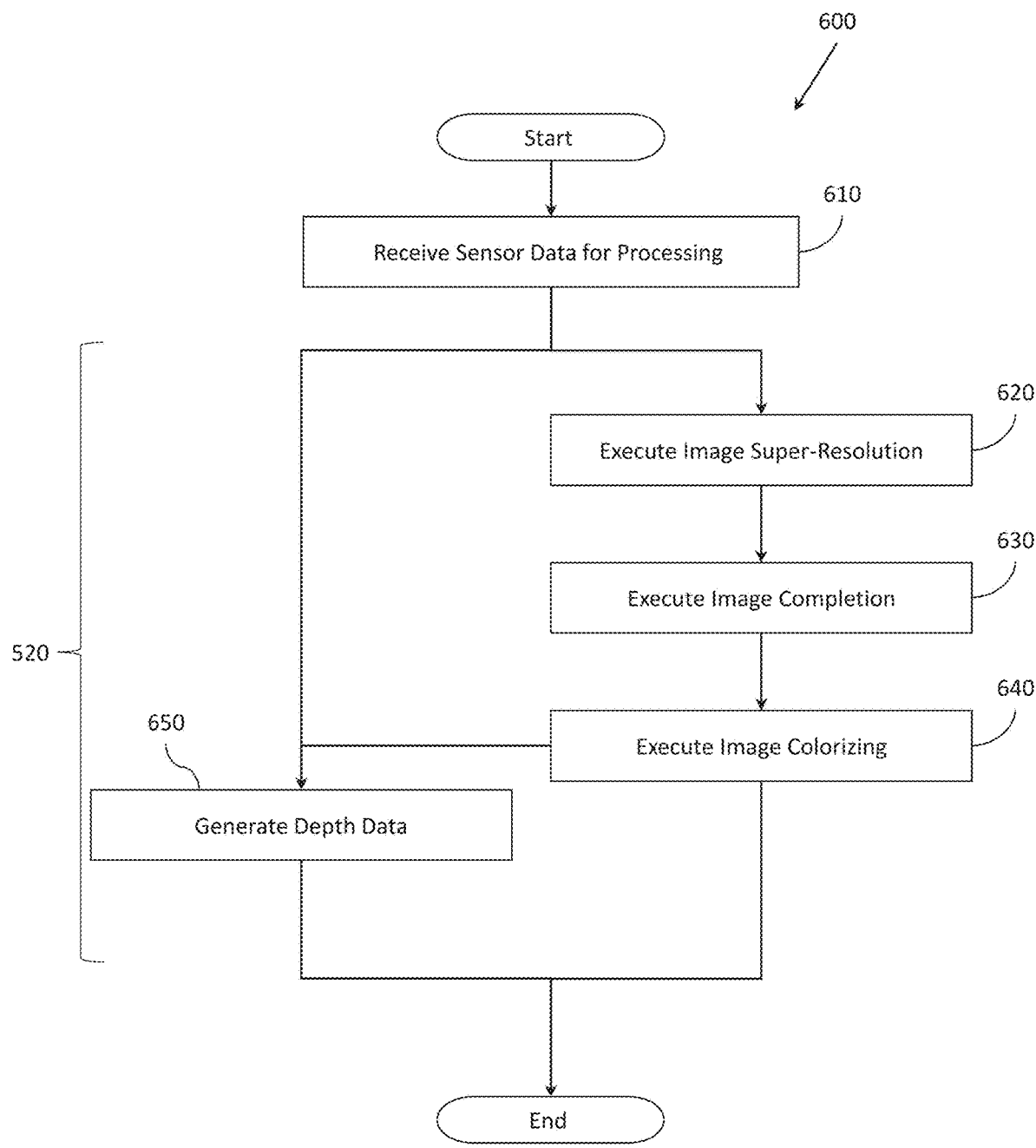
FIG. 6 illustrates one embodiment of a method associated with executing an enhancer pipeline.

Additional aspects of processing sensor data according to the enhancer pipeline will be discussed in relation to FIG. 6. FIG. 6 illustrates a method 600 associated with executing a processing pipeline over sensor data to enhance the sensor data. Method 600 will be discussed from the perspective of the refinement system 170 of FIG. 1. While method 600 is discussed in combination with the refinement system 170, it should be appreciated that the method 600 is not limited to being implemented within the refinement system 170 but is instead one example of a system that may implement the method 600.

At 610, the pipeline module 230 receives the sensor data 250 and provides the sensor data 250 to the enhancer pipeline. As noted above, the sensor data 250 generally includes at least a point cloud and an ambient image, which both have a low resolution and may include further aberrations. Moreover, as noted above, the pipeline module 230 may perform further processing when the sensor data 250 is batched for multiple LiDARs. In any case, the sensor data 250 is fed to the enhancer pipeline at 610.

At 620, the pipeline module 230 uses the enhancer pipeline to super resolve the ambient image from a low-resolution image into a high-resolution image according to a super-resolution neural network. The super-resolution neural network may be a GAN, CNN, or another form of neural network. The resulting high-resolution image is enhanced in relation to the original ambient image to provide improved resolution in order to, for example, better distinguish between objects depicted in the image.

At 630, the pipeline module 230 uses the enhancer pipeline to predict portions of the ambient image. The pipeline module 230 uses an image completion network within the enhancer pipeline, such as GAN to infer the missing regions from the available regions of the enhanced image. The missing regions may be subject to aberrations, including oversaturation or other perception artifacts from the LiDAR sensor. In any case, performing the image completion to predict the missing regions improves information provided by the enhanced image.

At 640, the pipeline module 230 executes an image colorizing process from the enhancer pipeline to colorize the enhanced image. In one approach, the enhancer pipeline further includes a CNN that is trained to colorize grayscale images by converting the grayscale images into RGB images. Adding color to the image can provide additional cues about objects and improves the overall quality of the image for use with various computations.

At 650, the pipeline module 230 generates additional depth data within the point cloud using the enhancer pipeline. In one approach, the pipeline module densifies the point cloud using a high-resolution image that is colorized and derived from the ambient image (i.e., the enhanced image from prior steps). In various approaches, the pipeline module 230 may use different forms of a deep neural network (DNN) to generate the additional depth data. In any case, the pipeline module 230 performs multiple different functions on the original sensor data 250, including super-resolving the ambient image into a high-resolution image, completing the high-resolution image to fill-in missing portions, colorizing the high-resolution image, and densifying the point cloud to produce enhanced data from the original sensor data 250.

Figure 7:
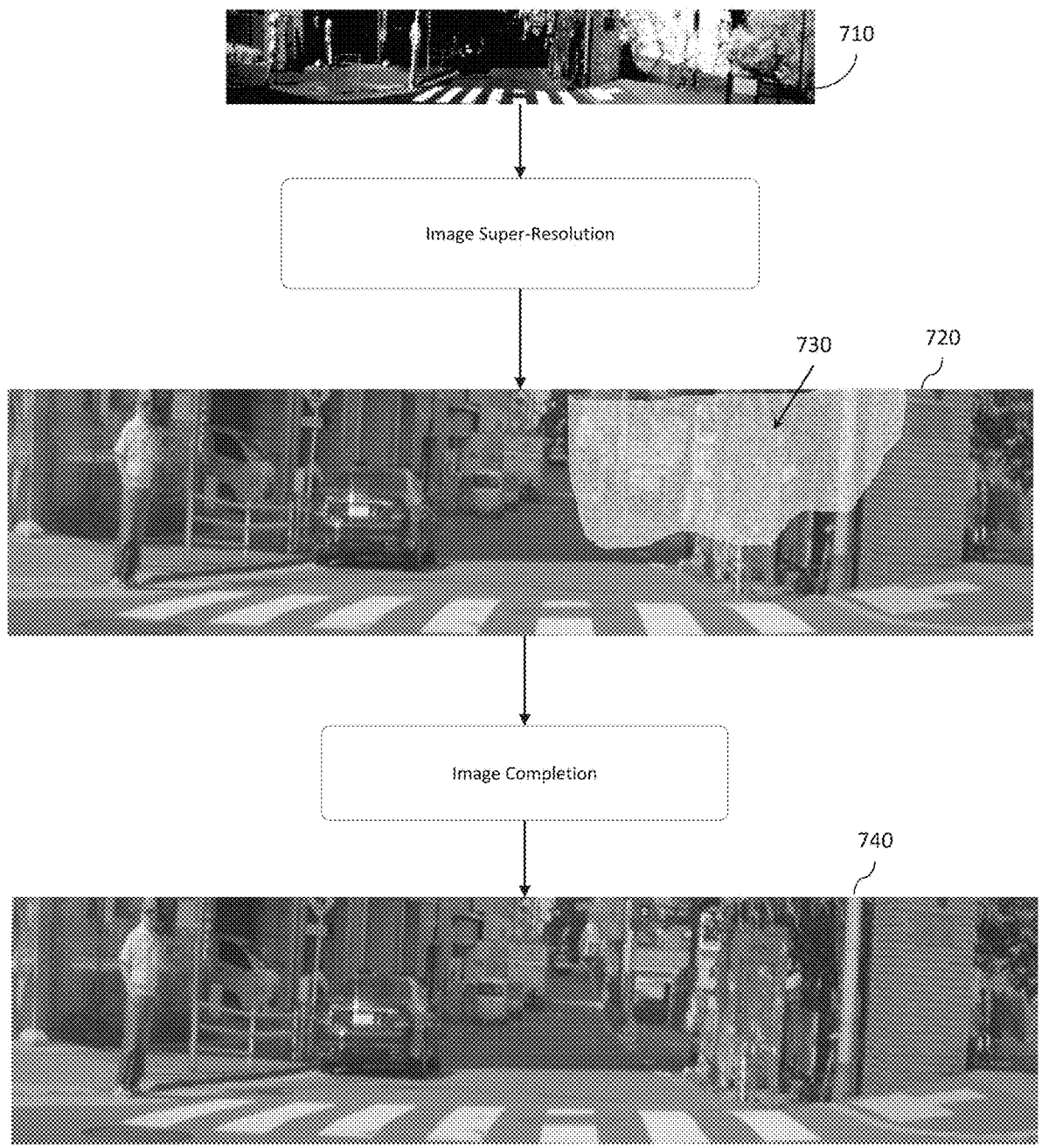
FIG. 7 illustrates examples of image super-resolution and image completion.
Figure 8:
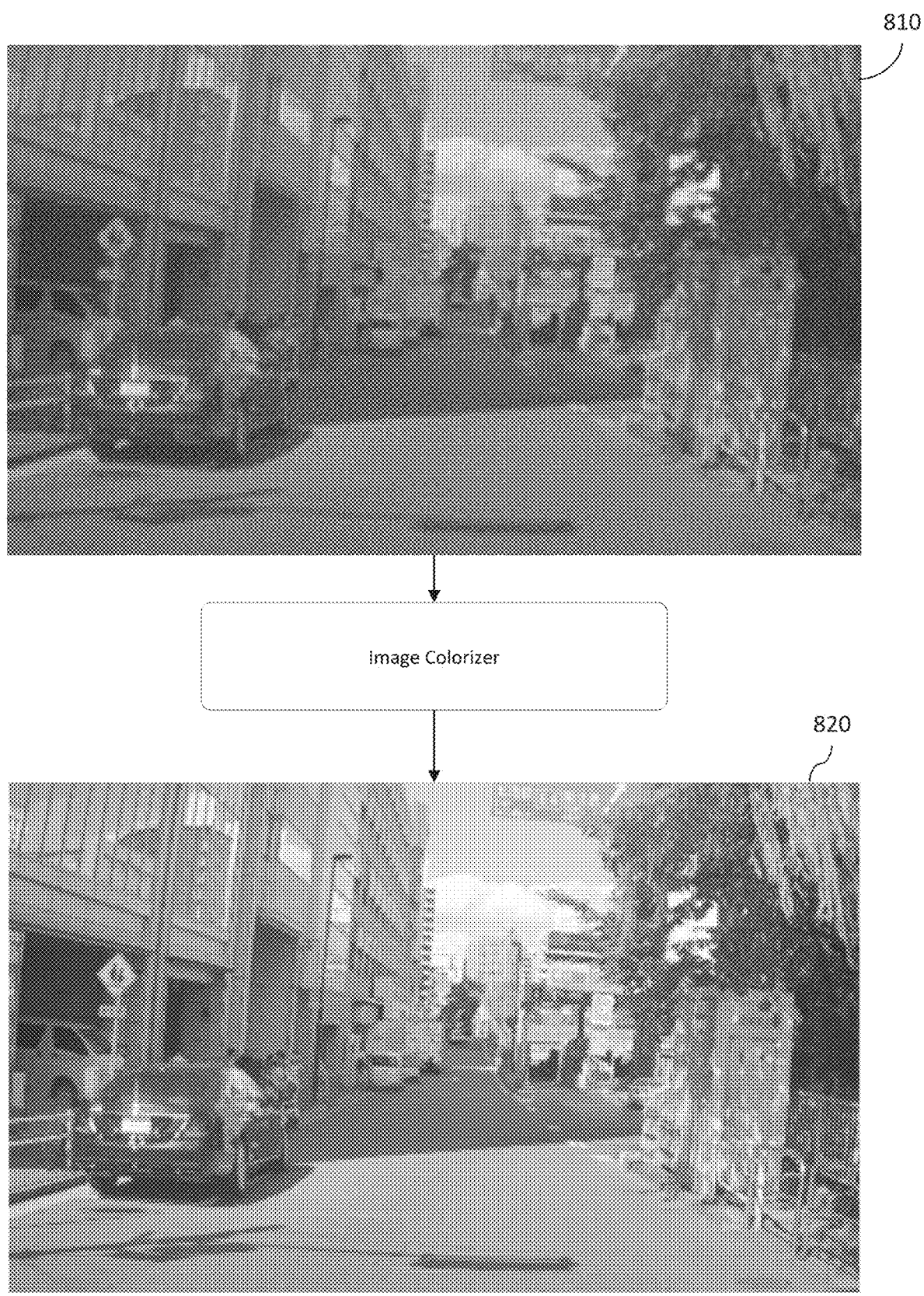
FIG. 8 illustrates an example of image colorizing.
Figure 9:
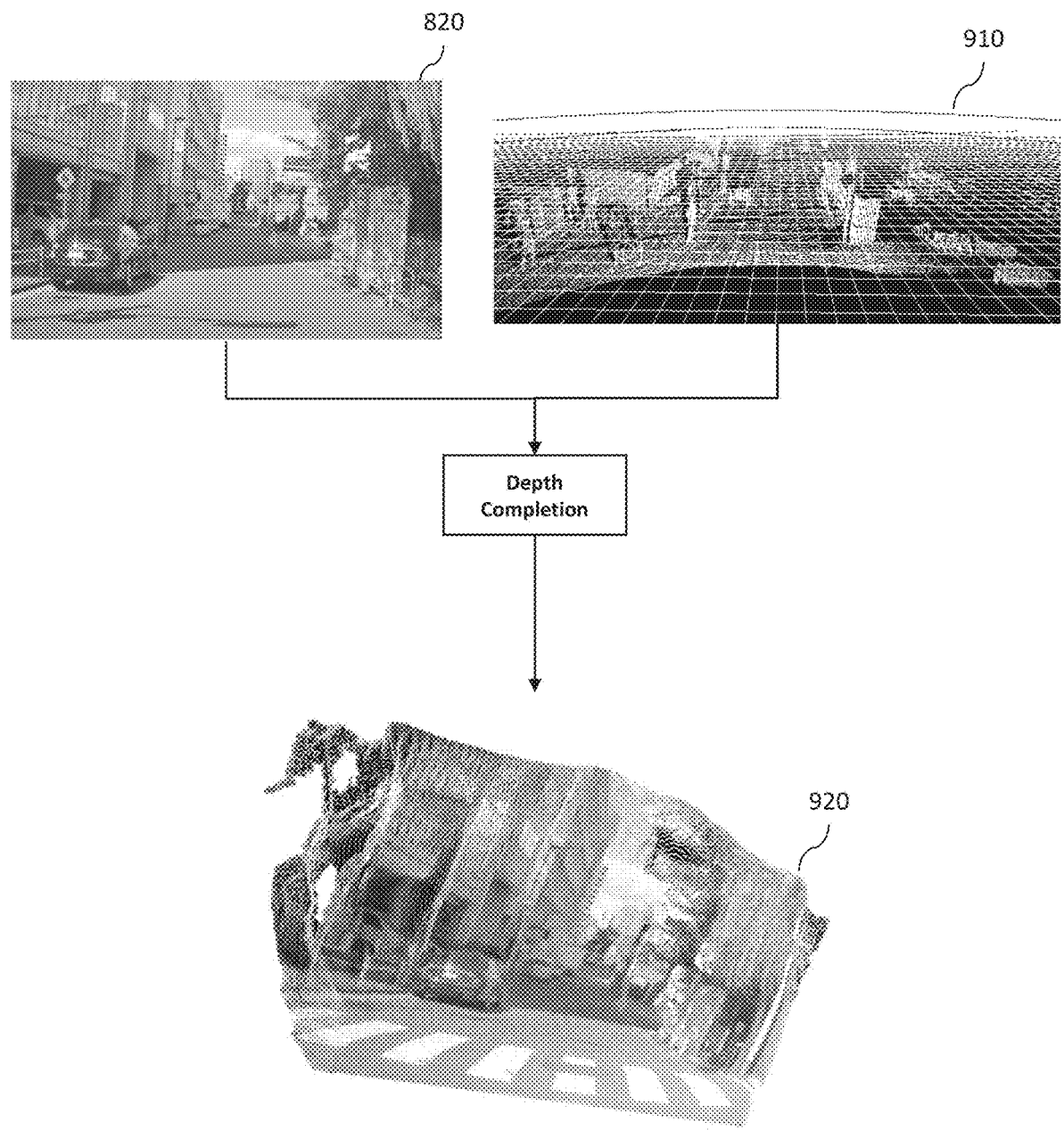
FIG. 9 illustrates an example of enhancing a point cloud.

As a further explanation of how the presently disclosed systems and methods function, consider FIGS. 7-9. FIG. 7 illustrates an example of an original ambient image 710 as the LiDAR sensor 123 may generate. The enhancer pipeline processes the ambient image 710 using image super-resolution (e.g., single-image super-resolution (SISR)) to generate enhanced image 720 with a higher resolution than the original image 710. However, as shown in the enhanced image 720 there is an aberration 730 that results from the original presence of direct sunlight, as seen in the image 710. Accordingly, the pipeline module 230 uses the image completion block of the enhancer pipeline to infer what should be present in the missing region corresponding to the aberration 730. As seen in the enhanced and completed image 740, the previously present aberration 730 is no longer present.

Continuing to FIG. 8, another enhanced image 810 is shown. The enhanced image 810 is a grayscale image. Thus, the pipeline module 230 uses the image colorizer block of the enhancer pipeline to convert the grayscale to RGB full color, as seen with image 820. It should be appreciated that even though image 820 is reproduced in grayscale, it is intended to represent a colorized image. Finally, FIG. 9 illustrates depth completion of the point cloud 910. As noted previously, the pipeline module 230 accepts the point cloud 910 and the enhanced image 820 that has been super-resolved, completed, and colorized as inputs. The pipeline module 230 may then perform depth completion using the corresponding block of the enhancer pipeline. The resulting super point cloud 920 includes additional depth information and may also be combined with the enhanced image 820 to provide an image quality representation. In this way, the refinement system 170 improves the original sensor data 250 from the LiDAR sensor 123 to improve the usefulness of the information from the LiDAR sensor 123 and provide a cost-effective solution for generating high-quality sensor data.

Additionally, it should be appreciated that the refinement system 170 from FIG. 1 can be configured in various arrangements with separate integrated circuits and/or electronic chips. In such embodiments, the sensor module 220 is embodied as a separate integrated circuit. Additionally, the pipeline module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies (e.g., method 500 of FIG. 5) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the refinement system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the refinement system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the refinement system 170, and/or the assistance system 160 may control some or all of these vehicle systems 150 and, thus, may be partially or fully autonomous.

The processor(s) 110, the refinement system 170, and/or the assistance system 160 can be operatively connected to communicate with the various vehicle systems 150 and/or individual components thereof. For example, returning to FIG. 1, the processor(s) 110, the refinement system 170, and/or the assistance system 160 can be in communication to send and/or receive information from the various vehicle systems 150 to control the movement, speed, maneuvering, heading, direction, etc. of the vehicle 100. The processor(s) 110, the refinement system 170, and/or the assistance system 160 may control some or all of these vehicle systems 150.

The processor(s) 110, the refinement system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the refinement system 170, and/or the assistance system 160 can control the direction and/or speed of the vehicle 100. The processor(s) 110, the refinement system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the refinement system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more assistance systems 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the refinement system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A refinement system for enhancing an output of a LiDAR sensor, comprising:
 one or more processors;
 a memory communicably coupled to the one or more processors and storing:
  a sensor module including instructions that when executed by the one or more processors cause the one or more processors to acquire, using the LiDAR sensor, a point cloud and an ambient image, wherein the sensor module includes instructions to acquire the point cloud and the ambient image in parallel using the LiDAR sensor without a camera; and a pipeline module including instructions that when executed by the one or more processors cause the one or more processors to process the point cloud and the ambient image to generate enhanced data according to an enhancer pipeline that includes a set of processing routines, including instructions to at least correct aberrations in the ambient image to generate the enhanced data with a visible light image derived from at least the ambient image, wherein the pipeline module includes instructions to provide the enhanced data to at least one module to facilitate generating determinations about a surrounding environment of the LiDAR sensor from the enhanced data.

2. The refinement system of claim 1, wherein the pipeline module includes instructions to provide the enhanced data to the at least one module including instructions to provide the enhanced data to an automated driving module to facilitate control of a vehicle, and wherein the pipeline module includes instructions to process the point cloud and the ambient image according to the enhancer pipeline including instructions to at least correct aberrations in the ambient image to generate the enhanced data with a visible light derived from at least the ambient image.

3. The refinement system of claim 1, wherein the pipeline module includes instructions to process the point cloud and the ambient image including instructions to super-resolve the ambient image from a low-resolution image into a high-resolution image according to a super-resolution neural network, and wherein the point cloud is depth information about distances between the LiDAR sensor and points in the surrounding environment and the ambient image is a visible light representation of the surrounding environment collected by the LiDAR sensor.

4. The refinement system of claim 1, wherein the pipeline module includes instructions to process the point cloud and the ambient image including instructions to predict portions of the ambient image subject to aberrations using a high-resolution image derived from the ambient image and a generative adversarial network (GAN), and wherein the pipeline module includes instructions to predict the portions including instructions to predict sections of the ambient image that are missing as a result of the aberrations.

5. The refinement system of claim 1, wherein the pipeline module includes instructions to process the point cloud and the ambient image including instructions to colorize the ambient image by converting a high-resolution image derived from the ambient image into an RGB image using a convolutional neural network (CNN).

6. The refinement system of claim 1, wherein the pipeline module includes instructions to process the point cloud and the ambient image including instructions to densify the point cloud using a high-resolution image that is colorized and derived from the ambient image according to a deep neural network (DNN).

7. The refinement system of claim 1, wherein the sensor module includes instructions to acquire and process the point cloud and the ambient image including instructions to acquire a batch of point clouds and ambient images from multiple sensors and batch processing the batch to generate the enhanced data together for the batch.

8. The refinement system of claim 1, wherein the pipeline module includes instructions to process the point cloud and the ambient image according to the enhancer pipeline including instructions to super-resolve the ambient image into a high-resolution image, colorize the high-resolution image, complete the high-resolution image to fill-in missing portions, and densify the point cloud, wherein the sensor module includes instructions to acquire the point cloud and the ambient image including instructions to control the LiDAR sensor to acquire the point cloud and the ambient image together, and wherein the LiDAR sensor is a single-photon avalanche diode (SPAD) LiDAR.

9. A non-transitory computer-readable medium storing instructions for enhancing an output of a LiDAR sensor and that when executed by one or more processors, cause the one or more processors to:

acquire, using the LiDAR sensor without a camera, a point cloud and an ambient image in parallel;

process the point cloud and the ambient image to generate enhanced data according to an enhancer pipeline that includes a set of processing routines; and provide the enhanced data to at least one module to facilitate generating determinations about a surrounding environment of the LiDAR sensor from the enhanced data.

10. The non-transitory computer-readable medium of claim 9, wherein the instructions to provide the enhanced data to the at least one module include instructions to provide the enhanced data to an automated driving module to facilitate control of a vehicle, and wherein the instructions to process the point cloud and the ambient image according to the enhancer pipeline include instructions to at least correct aberrations in the ambient image to generate the enhanced data with a visible light derived from at least the ambient image.

11. The non-transitory computer-readable medium of claim 9, wherein the instructions include instructions to process the point cloud and the ambient image according to the enhancer pipeline include instructions to super-resolve the ambient image into a high-resolution image, colorize the high-resolution image, complete the high-resolution image to fill-in missing portions, and densify the point cloud, and wherein the point cloud is depth information about distances between the LiDAR sensor and points in the surrounding environment and the ambient image is a visible light representation of the surrounding environment collected by the LiDAR sensor.

12. The non-transitory computer-readable medium of claim 9, wherein the instructions to acquire the point cloud and the ambient image include instructions to control the LiDAR sensor to acquire the point cloud and the ambient image together, and wherein the LiDAR sensor is a single-photon avalanche diode (SPAD) LiDAR.

13. A method of enhancing an output of a LiDAR sensor, comprising:

acquiring, using the LiDAR sensor without a camera, a point cloud and an ambient image in parallel;

processing the point cloud and the ambient image to generate enhanced data according to an enhancer pipeline that includes a set of processing routines; and providing the enhanced data to at least one module to facilitate generating determinations about a surrounding environment of the LiDAR sensor from the enhanced data.

14. The method of claim 13, wherein providing the enhanced data to the at least one module includes providing the enhanced data to an automated driving module to facilitate control of a vehicle, and wherein processing the point cloud and the ambient image according to the enhancer pipeline includes at least correcting aberrations in the ambient image to generate the enhanced data with a visible light image derived from at least the ambient image.

15. The method of claim 13, wherein processing the point cloud and the ambient image includes super resolving the ambient image from a low-resolution image into a high-resolution image according to a super-resolution neural network, and wherein the point cloud is depth information about distances between the LiDAR sensor and points in the surrounding environment and the ambient image is a visible light representation of the surrounding environment collected by the LiDAR sensor.

16. The method of claim 13, wherein processing the point cloud and the ambient image includes predicting portions of the ambient image subject to aberrations using a high-resolution image derived from the ambient image and a generative adversarial network (GAN), wherein predicting the portions includes predicting sections of the ambient image that are missing as a result of the aberrations.

17. The method of claim 13, wherein processing the point cloud and the ambient image includes colorizing the ambient image by converting a high-resolution image derived from the ambient image into an RGB image using a convolutional neural network (CNN).

18. The method of claim 13, wherein processing the point cloud and the ambient image includes densifying the point cloud using a high-resolution image that is colorized and derived from the ambient image according to a deep neural network (DNN).

19. The method of claim 13, wherein acquiring and processing the point cloud and the ambient image includes acquiring a batch of point clouds and ambient images from multiple sensors and batch processing the batch to generate the enhanced data together for the batch.

20. The method of claim 13, wherein processing the point cloud and the ambient image according to the enhancer pipeline includes super-resolving the ambient image into a high-resolution image, colorizing the high-resolution image, completing the high-resolution image to fill-in missing portions, and densifying the point cloud, wherein acquiring the point cloud and the ambient image includes controlling the LiDAR sensor to acquire the point cloud and the ambient image together, and wherein the LiDAR sensor is a single-photon avalanche diode (SPAD) LiDAR.

\* \* \* \* \*